(12) United States Patent
Watson et al.

(10) Patent No.: US 10,452,645 B2
(45) Date of Patent: Oct. 22, 2019

(54) MODIFICATION AND VALIDATION OF SPATIAL DATA

(71) Applicant: 1SPATIAL GROUP LIMITED, Cambridge (GB)

(72) Inventors: Paul James Watson, Cambridge (GB); Adrian Cuthbert, Cambridge (GB); Jonathan Mark Billing, Cambridge (GB)

(73) Assignee: ISPATIAL GROUP LIMITED, Cambridge (GB)

(*) Notice: Subject to any disclaimer, the term of this patent is extended or adjusted under 35 U.S.C. 154(b) by 316 days.

(21) Appl. No.: 15/362,333

(22) Filed: Nov. 28, 2016

(65) Prior Publication Data

US 2017/0075948 A1     Mar. 16, 2017

Related U.S. Application Data

(63) Continuation of application No. 14/992,241, filed on Jan. 11, 2016, now Pat. No. 9,542,416, which is a
(Continued)

(30) Foreign Application Priority Data

Sep. 4, 2013   (GB) .................................. 1315761.5

(51) Int. Cl.
  *G06F 16/23*  (2019.01)
  *G06F 16/25*  (2019.01)
  (Continued)

(52) U.S. Cl.
  CPC .......... *G06F 16/2365* (2019.01); *G06F 16/16* (2019.01); *G06F 16/20* (2019.01); *G06F 16/258* (2019.01); *G06F 16/29* (2019.01)

(58) Field of Classification Search
  CPC ................ G06Q 30/02; G06Q 30/0266; G06F 17/30241; G06F 17/2288; G06F 9/52;
  (Continued)

(56) References Cited

U.S. PATENT DOCUMENTS

6,985,929 B1    1/2006  Wilson et al.
7,290,056 B1 * 10/2007  McLaughlin, Jr. .......................... H04L 43/0852
                                                                        709/201
(Continued)

FOREIGN PATENT DOCUMENTS

EP    2019362 A2   1/2009
GB    247 740 A    2/1926

OTHER PUBLICATIONS

Anonymous: "Oracle Database Concepts—Data Integrity", Nov. 20, 2011, Retrieved from the Internet Jun. 1, 2016 (18 Pages).
(Continued)

*Primary Examiner* — Etienne P Leroux
(74) *Attorney, Agent, or Firm* — Brown Rudnick LLP

(57) ABSTRACT

A method for validating data changes made to a database is disclosed. The changes are made in the context of a transaction, and validation is performed using a rules database storing a plurality of rules. The method includes identifying a set of data entities affected by one or more data changes made in the context of the transaction. In response to an instruction to commit the transaction, data entities in the set of affected data entities are validated using rules from the rules database. The transaction is committed in dependence on the outcome of the validation.

20 Claims, 9 Drawing Sheets

Related U.S. Application Data continuation of application No. PCT/GB2014/052658, filed on Sep. 3, 2014.

(51) Int. Cl.
  *G06F 16/29* (2019.01)
  *G06F 16/16* (2019.01)
  *G06F 16/20* (2019.01)

(58) Field of Classification Search
  CPC .. G06F 16/24564; G06F 21/31; G06F 17/243; G06F 16/2379; G06F 16/2365; G01C 21/32; G01C 21/26; G01C 21/20; G08G 1/20; H04L 43/0852
  See application file for complete search history.

(56) References Cited

U.S. PATENT DOCUMENTS

| | | | | |
|---|---|---|---|---|
| 8,443,367 | B1* | 5/2013 | Taylor | G06F 9/52 718/1 |
| 8,924,147 | B2* | 12/2014 | Vellaikal | G06Q 30/0266 701/400 |
| 2003/0084074 | A1 | 5/2003 | Balogh et al. | |
| 2004/0117358 | A1* | 6/2004 | von Kaenel | G06F 17/30241 |
| 2004/0210837 | A1 | 10/2004 | Black et al. | |
| 2005/0149251 | A1* | 7/2005 | Donath | G01C 21/26 701/532 |
| 2005/0278386 | A1* | 12/2005 | Kelly | G01C 21/32 |
| 2006/0085459 | A1* | 4/2006 | Noble | G06F 16/24564 |
| 2007/0112878 | A1* | 5/2007 | Bennett | G06F 16/2379 |
| 2007/0239915 | A1 | 10/2007 | Saha et al. | |
| 2008/0262723 | A1* | 10/2008 | Wuersch | G01C 21/20 701/414 |
| 2010/0074538 | A1 | 3/2010 | Mishra et al. | |
| 2010/0077380 | A1 | 3/2010 | Baker et al. | |
| 2010/0223543 | A1* | 9/2010 | Marston | G06F 17/243 715/224 |
| 2011/0252009 | A1 | 10/2011 | Simons et al. | |
| 2011/0307940 | A1* | 12/2011 | Wong | G06F 21/31 726/4 |
| 2011/0314230 | A1 | 12/2011 | Zhang et al. | |
| 2012/0089920 | A1* | 4/2012 | Eick | G08G 1/20 715/739 |
| 2013/0185252 | A1* | 7/2013 | Palmucci | G06F 17/2288 707/608 |
| 2014/0379359 | A1* | 12/2014 | Basey | G06Q 30/02 705/2 |

OTHER PUBLICATIONS

Anonymous: "PostgreSQL: Documentation: Manuals: PostgreSQL 9.1: Set Constraints", Jun. 12, 2011, Retrieved from the Internet Jun. 1, 2016 (2 Pages).

Elmasri, Ramez et al., "Chapter 26: Enhanced Data Models for Advanced Applications ED" Fundamentals of Database Systems (Sixth Edition), Apr. 9, 2010, pp. 931-991 (63 Pages).

Elmasri, Ramez et al., "Chapter 3: The Relational Data Model and Relational Database Constraints" Fundamentals of Database Systems (Sixth Edition), Apr. 9, 2010, pp. 59-85 (29 Pages).

Examination Report dated Jun. 10, 2016 for European Application No. 14762065.2 (11 Pages).

Gray, Jim et al., "Transaction Processing: Concepts and Techniques—Chapter 1—Introduction" Jan. 1, 1993 (45 Pages).

International Search Report and Written Opinion for International Application No. PCT/GB2014/052658 dated Mar. 12, 2015 (6 Pages).

Watson, P., "Formal Languages for Expressing Spatial Data Constraints and Implications for Reporting of Quality Metadata." 5th International Symposium on Spatial Data Quality, ISSDQ 2007, Enschede, NL. ISPRS Working Group II/ 7, available at: http://citeseerx.ist.psu.edu/viewdoc/download?doi=10.1.1.221.9395&rep=rep1&type=pdf<https://protect-us.mimecast.com/s/oX30BNhpxK2cY> (8 Pages).

Watson, P.J., "Formal languages for expressing spatial data constraints and implications for reporting of quality metadata." In: Stein A., Shi W., Bijker W. eds. Quality Aspects in Spatial Data Mining. Boca Raton, FL, USA: CRC Press, 2009 pp. 329-334. ISBN: 978-1-4200-6926-6 (9 Pages).

\* cited by examiner

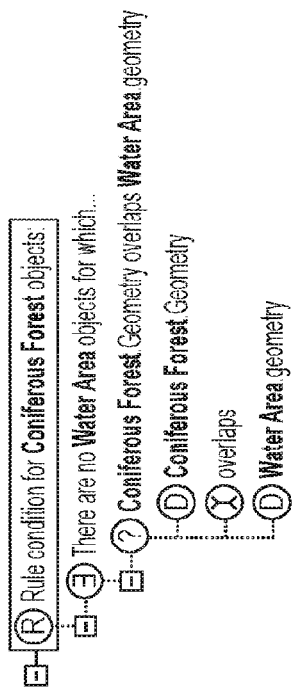
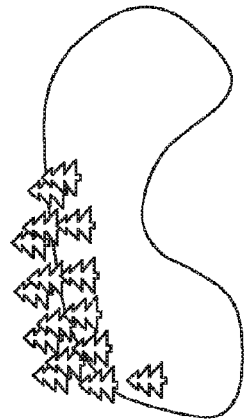
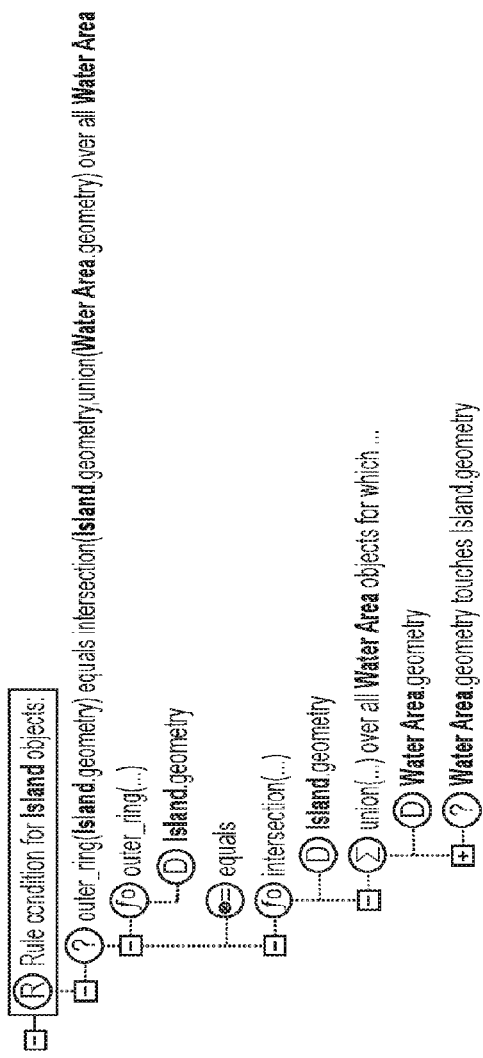
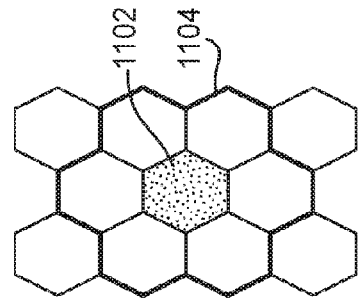

MODIFICATION AND VALIDATION OF SPATIAL DATA

This is a continuation of U.S. patent application Ser. No. 14/992,241, filed Jan. 11, 2016. U.S. patent application Ser. No. 14/992,241 is a continuation of International Application No. PCT/GB2014/052658, filed Sep. 3, 2014, which claims priority to GB patent application 1315761.5, filed Sep. 4, 2013.

The present invention relates to modification and validation of data in a database. Particular examples relate to databases storing and managing geospatial information.

In many real-world applications, the quality of data in a database can determine to a large extent the effectiveness and usefulness of applications and processes built on that data. Data quality includes, for example, the accuracy and completeness of data, as well as the degree to which the data meets real-world constraints. Ensuring data quality is a difficult problem, especially where databases are large and complex, and where multiple users may access and modify the data simultaneously.

Conventional approaches to ensuring data quality include, for example, checking data values as they are entered in a user interface. Such approaches however can only catch relatively simple data entry errors. Furthermore, given the interdependency between data elements in a complex dataset, a change in a particular data element may only render the data valid or invalid when viewed in conjunction with other changes that are made to other data elements, possibly at a later time. However, it is generally not feasible to validate the entire database repeatedly in order to catch problems related to such interdependencies.

More complex approaches to validation typically require bespoke validation code to be added to an application to analyse provided data. However, this approach adds to the development cost of the application, and is inflexible because validation behaviour cannot easily be adapted to changing user requirements.

The present invention seeks to provide approaches to validation of data that alleviate some of these problems.

Accordingly, in a first aspect of the invention, there is provided a method for validating data changes made to a database, wherein the changes are made in the context of (i.e. as part of or during) a transaction, using a rules database storing a plurality of rules, the method comprising: identifying a set of data entities affected by one or more data changes made in the context of the transaction; in response to an instruction to commit the transaction, validating data entities in the set of affected data entities using rules from the rules database; and committing the transaction in dependence on the outcome of the validation.

The use of rule-based validation provides for a flexible and configurable approach to validation. Furthermore, by performing validation on a set of data entities implicated in a transaction at the point of transaction commit, the validation is driven directly by changes to the data as they are made, and ensures that the database is in a valid state at the end of a transaction, whilst potentially allowing an invalid state during the transaction (i.e. whilst multiple interdependent modifications may be in progress).

The step of identifying affected data entities preferably comprises adding an identifier of a data entity to one or more lists or sets of affected data entities in response to a data change affecting the data entity. The database change may comprise an addition, deletion, or modification of the data entity, or any other operation deemed to trigger a need to validate the data entity.

The step of identifying affected data entities preferably comprises, in response to a change made to a first data entity, identifying one or more dependent data entities of the first data entity, the dependent data entities having predetermined relationships with the first data entity, and adding identifiers of the first data entity and the identified dependent data entities to the list or set of affected data entities. The database may comprise geospatial data, in which case the dependent data entities may comprise data entities having one or more predetermined geospatial relationships with the first data entity. Other forms or relationships may include particular predefined associations between data entities (e.g. explicit references in the database between entities).

The step of identifying affected data entities preferably comprises invoking a dependencies method defined for a class of the first data entity, the dependencies method identifying the set of dependent data entities of the first data entity, preferably wherein the dependencies method returns a set of data entity identifiers of the dependent data entities. The phrase "defined for a class" preferably encompasses being defined in respect of the specific class or being defined in respect of a superclass of the specific class (and consequently inherited by the class).

The validating step preferably comprises performing validation of each data entity identified in the list of affected data entities, for example by invoking a rules-based validation engine individually for each entity or by passing the full list to the validation engine in a single call.

The data changes are preferably performed in response to calls from an application, the validating step preferably comprising invoking a validation callback registered by the application, preferably wherein the validation callback is arranged to invoke a rule-based validation engine to validate one or more data entities based on rules in the rule database. This puts the validation behaviour under the dynamic control of the application.

Preferably, the method further comprises: initiating the transaction in response to a transaction start instruction; after initiating the transaction, receiving one or more instructions specifying data changes to be made in the context of the transaction; for each data change instruction, adding identifiers of one or more data entities changed responsive to the data change instruction and optionally identifiers of one or more dependent data entities of the changed data entities to a validation list or set; and in response to the commit instruction, performing validation based on the data entities in the validation list or set. Note that the term "list" as used herein may include any data structure(s) by which a collection of entities can be identified, and does not necessarily imply any ordering of list elements; thus terms such as "list", "set" or "collection" may be used interchangeably. Dependent data entities may be identified as set out above.

The committing step preferably comprises: determining whether the transaction can be committed based on the outcome of the validation; and committing the transaction only if it is determined that the transaction can be committed. For example, commit may proceed if all validated data entities meet the relevant validation rules (e.g. the validation rules evaluate to "true"). Alternatively, whether commit can proceed may depend on which data entities and/or which rules fail validation. The method may comprise rolling back the transaction if it is determined that the transaction cannot be committed (e.g. if one or more data entities fail validation).

In a further aspect of the invention (which may be combined with the above aspect), there is provided a method for validating data changes in a database, wherein the database is adapted to store a versioned dataset, wherein a dataset version specifies differences between itself and a parent dataset version from which the dataset version is derived, the differences corresponding to data changes made in the dataset version, and wherein validation is performed using a rules database storing a plurality of rules, the method comprising: receiving a request to merge a first dataset version into a second dataset version, the second dataset version being a parent dataset version of the first dataset version; and in response to the request: identifying a set of data entities affected by data changes made in the first dataset version; validating data entities in the set of affected data entities using rules from the rules database; and merging the first dataset version into the second dataset version in dependence on the outcome of the validation.

This approach allows validation to be performed at the point where changes are to be applied to a parent version, to ensure that the changes in the child version are consistent with the data in the parent version.

Merging the first dataset version into the second dataset version preferably comprises modifying the second dataset version based on the differences specified in the first dataset version.

Identifying a set of affected data entities preferably comprises identifying data entities to which changes have been applied in the first dataset version, the changes preferably including one or more of: addition of data entities, modification of data entities, and deletion of data entities. Alternatively or additionally, identifying a set of affected data entities may comprise identifying dependent data entities of data entities to which changes have been applied in the first dataset version. This can allow validation to be performed on data entities that have not been directly modified in the child version (and thus may not exist separately in the child version), but for which dependencies with directly modified entities exist, to thereby ensure that the modified data in the child version is consistent with other data in the parent version, without however having to validate the entire dataset.

Dependencies may be identified as already set out above in relation to the first aspect. Preferably, the method comprises, for each data entity to which changes have been applied in the first dataset version, invoking a dependencies method defined for the class of the data entity, the dependencies method returning a set of identifiers of dependent data entities; and adding the identified dependent data entities to the set of affected data entities.

The method may further comprise analysing whether first changes made in the first dataset version conflict with second changes previously applied to the second dataset version (e.g. changes applied since a working copy of data corresponding to the first dataset version was exported from the database); and performing the merging step in dependence on the analysis. The merging step may be performed only when no conflicts are found or alternatively a partial merge may be performed based on any identified conflicts. The first and second changes may be associated with different database users. Thus, conflicts between changes made by different users working on different local copies of data can be detected at the point that the users' dataset versions are merged into the parent version, removing the need to lock large parts of the data for exclusive access by one user.

Features of the above-described aspects may be combined in any appropriate manner. Furthermore, the following features may be applied to either of the first and second aspects set out above.

In a preferred embodiment, the database may store geospatial data. The rules database in that case preferably comprises rules specifying geospatial constraints. For example, the rules database may comprise rules specifying required relationships between geospatial features (for example that certain types of geospatial features may or may not overlap or intersect).

Some or all of the rules in the rules database are preferably associated with respective data entity types, wherein for a given rule a respective associated data entity type preferably indicates a type of data entity to which the given rule applies. The method preferably comprises validating data entities in the set of affected data entities using rules selected from the rules database based on the data entity types of the affected data entities.

Preferably, the validating comprises, for a data entity to be validated, the data entity having a given data entity type: identifying one or more validation rules stored in the rules database associated with a data entity type corresponding to the given data entity type; and applying the identified validation rule(s) to the data entity. Here a "corresponding data entity type" may be the same data entity type or a related data entity type, e.g. a same class or superclass.

In preferred embodiments, the data entities are objects in an object-oriented data representation associated with the database, and the data entity types are preferably classes of the objects (e.g. in an object-oriented class hierarchy). Some or all of the rules in the rules database preferably specify an object class to which each respective rule applies. A rule applying to a particular object class is preferably applied by the rules engine to objects of that class and to objects of subclasses of the class.

The validating step thus preferably comprises, for a data entity (or object) to be validated, the data entity having a given object class: identifying one or more validation rules stored in the rules database defined for the given object class or a superclass of the given object class; and applying the identified validation rule(s) to the data entity.

The method may further comprise outputting validation result information indicating an outcome of the validation, preferably wherein the validation result information specifies one or both of: a set of data entities having failed validation; and for any data entity having failed validation, an indication of one or more failed validation rules.

The method may further comprise performing a corrective action in response to a failed validation of a data entity, and optionally repeating the failed validation after performing the corrective action. The term "failed validation" preferably refers to the situation where a data entity does not fulfil the constraint specified by a given rule (e.g. the rule evaluates to "false").

The validation rules preferably define Boolean-valued logic expressions. Rules are preferably specified using a rule-specification language, preferably based on a formal logic, preferably a first-order predicate logic or description logic. The rules are preferably encoded/stored in an XML encoding.

The invention also provides a data processing system, device or apparatus having means (e.g. in the form of a processor and associated memory) for performing a method as set out in any of the preceding claims.

Thus, in a further aspect, the invention provides a system for validating data changes made to a database, wherein the changes are made in the context of a transaction, using a rules database storing a plurality of rules, the system comprising at least one processor and associated memory configured to: identify a set of data entities affected by one or more data changes made in the context of the transaction; in response to an instruction to commit the transaction, validate data entities in the set of affected data entities using rules from the rules database; and commit the transaction in dependence on the outcome of the validation.

In a further aspect, the invention provides a system for validating data changes in a database, wherein the database is adapted to store a versioned dataset, wherein a dataset version specifies differences between itself and a parent dataset version from which the dataset version is derived, the differences corresponding to data changes made in the dataset version, and wherein validation is performed using a rules database storing a plurality of rules, the system comprising at least one processor and associated memory configured to: receive a request to merge a first dataset version into a second dataset version, the second dataset version being a parent dataset version of the first dataset version; and in response to the request: identify a set of data entities affected by data changes made in the first dataset version; validate data entities in the set of affected data entities using rules from the rules database; and merge the first dataset version into the second dataset version in dependence on the outcome of the validation.

In either of the above aspects the at least one processor is preferably further configured to perform any method as set out herein.

The invention also provides a computer program or computer program product (e.g. in the form of a tangible computer-readable medium) comprising software code adapted, when executed on a data processing apparatus, to perform any method as set out herein.

In a further aspect (which may be combined with any of the above aspects), the invention provides a data processing system, comprising an application configured to send requests to modify data to a database management system and to register a validation callback with the database management system for validation of data; a database management system adapted to receive and execute the requests to modify data, the database management system having means for identifying a set of data entities affected by modifications made responsive to the requests; and means for invoking the validation callback registered by the application in respect of the identified data entities. Corresponding method and computer program product aspects are also provided.

This architecture allows validation to be tied into the transactional processing performed by the database management system, whilst placing the validation under the control of the application, allowing the application to adjust the validation behaviour on a dynamic basis as needed. The term "callback" preferably refers to call information for calling a function, method, or other type of operation that is external to the database management system and may or may not be part of the application. Preferably, the validation callback is arranged to invoke a rule-based validation engine to validate the identified data entities, preferably wherein the rule-based validation engine is arranged to validate the identified data entities based on validation rules stored in a rule database. The database management system is preferably configured to invoke the validation callback during committing of a transaction, preferably wherein the set of affected data entities comprises data entities affected by data changes that occurred in the context of the transaction. The system is preferably arranged to perform a method as set out in any of the above-described aspects of the invention.

In a further aspect (which may be combined with any of the above aspects), the invention provides a method, or computer-readable medium for performing a method, the method comprising: registering, by an application, a validation callback with a database management system for validation of data; sending requests from the application to modify data to the database management system; and receiving and executing the requests to modify data at the database management system, the receiving and executing comprising: identifying a set of data entities affected by modifications made responsive to the requests; and invoking the validation callback registered by the application in respect of the identified data entities.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

Preferred features of the present invention will now be described, purely by way of example, with reference to the accompanying drawings, in which:—

Figure 12:
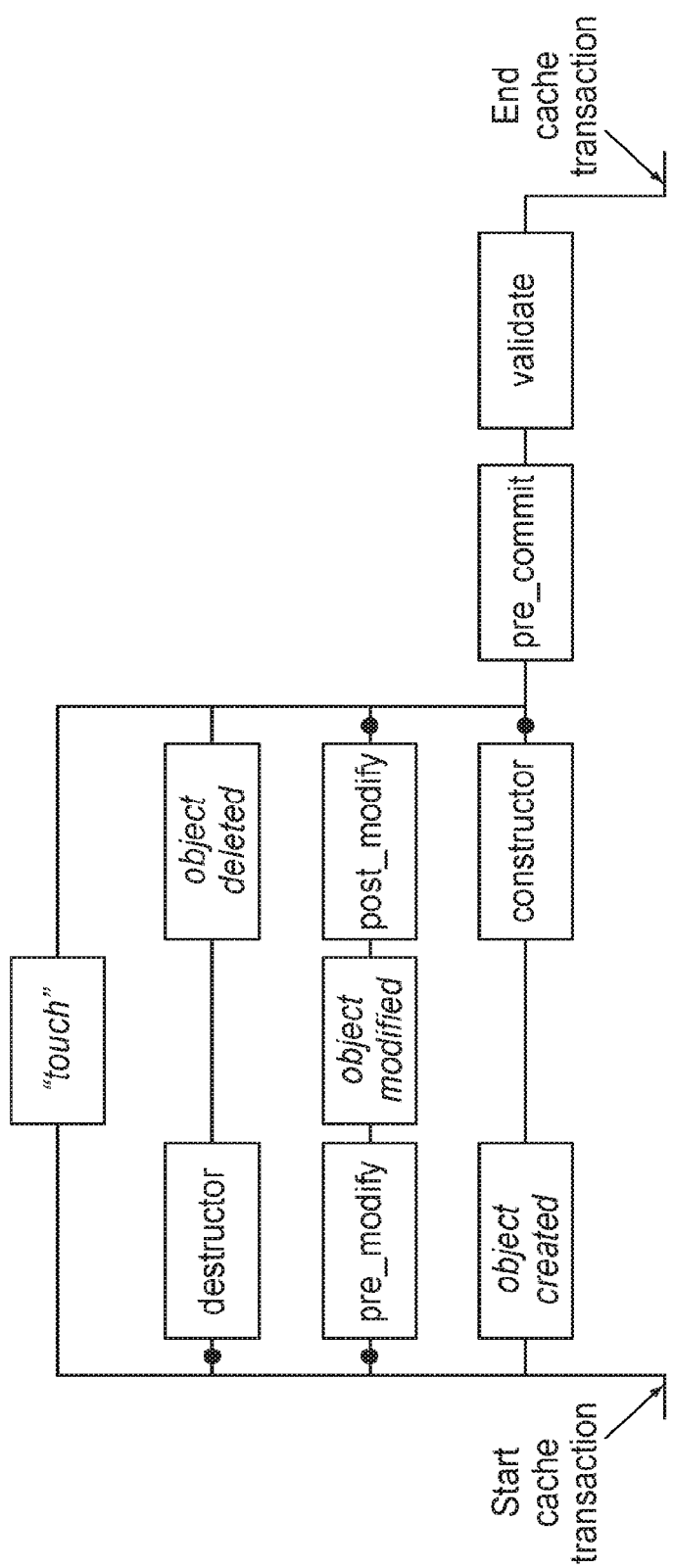

FIGS. 10A, 10B, 11A and 11B provide examples of geospatial validation rules; and FIG. 12 illustrates the object lifecycle.

OVERVIEW

Embodiments of the invention provide a system for managing, updating and validating spatial data.

Figure 1:
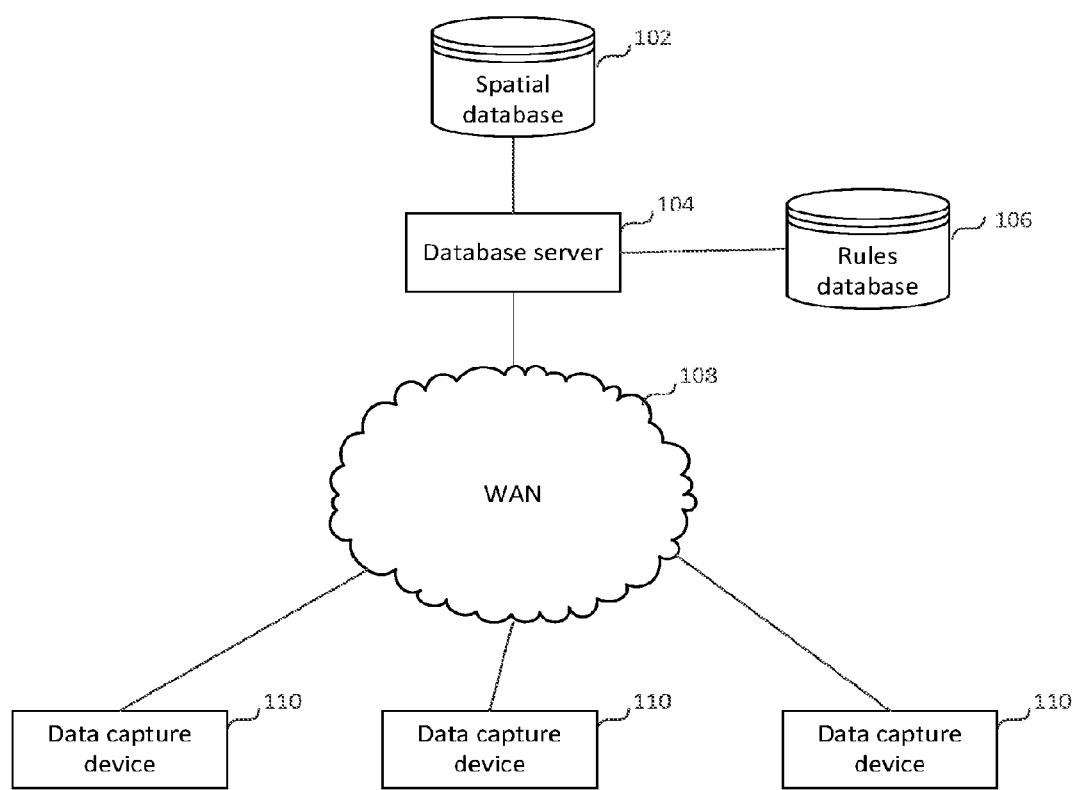
FIG. 1 illustrates in overview a database system providing rule-based data validation.

An embodiment is illustrated in overview in FIG. 1. The system includes a database server 104 providing access to spatial data stored in a spatial database 102. A rules database 106 stores data validation rules as discussed in more detail below. Though shown as separate components, the spatial database 102 and/or rules database 106 may be combined and/or integrated into the database server 104. Furthermore, each database may consist of multiple distributed data sources.

Multiple data capture devices 110 connect to the database server 104 via a network, e.g. a wide-area network (WAN) 108, such as the Internet, mobile communications networks, and the like. Data capture devices 110 are used to access spatial data stored in the database and update the spatial data. Data capture devices 110 may be fixed computer terminals or mobile terminals. For example, capture devices may include laptop or tablet computers, used in the field to perform geographical survey tasks and update spatial data held in the database 102.

The spatial database preferably uses an object-oriented data representation, adapted to the requirements of spatial data. The database may be a native object database or alternatively use an object-oriented data representation built on top of conventional database technology, such a relational database. In a preferred embodiment, the database is a Gothic object database for geospatial data, as developed and supplied by 1Spatial PLC, Cambridge, UK.

Figure 2:
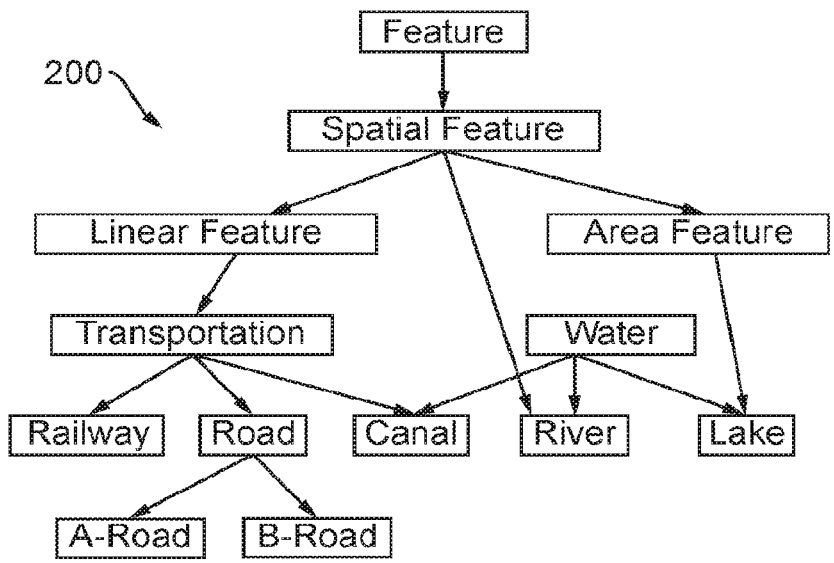
FIG. 2 shows an example of a schema for an object-oriented geospatial database.

The database provides for object-oriented modelling of geospatial feature data. The entities stored in the database are object instances, with properties and behaviours defined on the object classes in the database schema. The schema supports multiple inheritance between object classes, thus allowing a Gothic dataset to model the entities from the real world (e.g. roads, buildings, and rivers), in their family relationships, with their properties (attributes), behaviours (methods), and references to other entities (pointers). An example of an object model representing certain geospatial features is shown in FIG. 2. Such an object model can be represented in the database by a corresponding object-oriented database schema.

Figure 3:
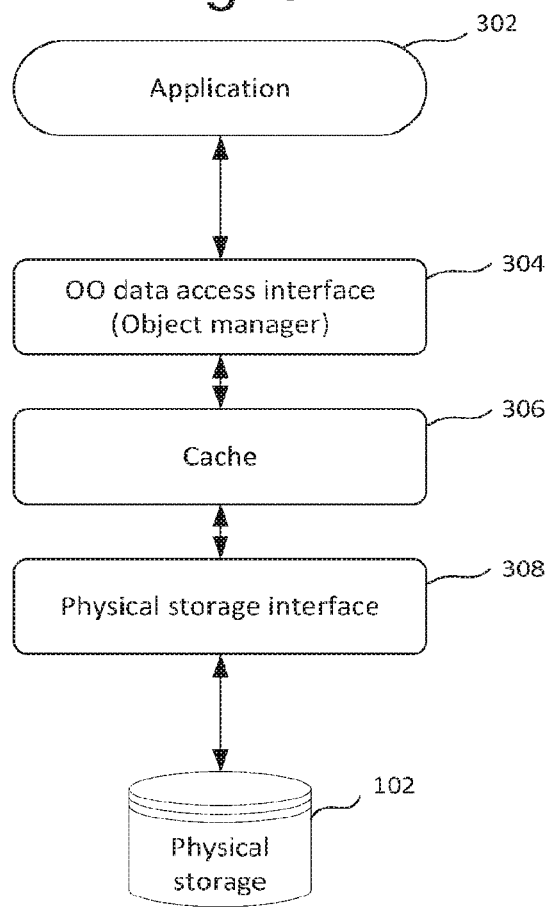
FIG. 3 illustrates an architecture for an object-oriented database system.

The Gothic database provides an object-oriented data access layer with in-memory caching of data, together with a physical storage layer for persistence of the data. This is illustrated in FIG. 3. As shown, an application 302 accesses data through an object-oriented data access interface 304, referred to as the Object Manager. The object manager presents an object-oriented view of the data in the database. Data for objects is stored and manipulated in memory in a cache layer 306. A physical storage interface 308 provides for reading data into the cache, and for writing changes made in the cache out to the persistent physical storage medium 102.

The physical storage medium 102 may comprise any suitable storage medium. Though this may be a natively object-oriented medium (e.g. an object database) it need not be; alternatively some other form of storage medium, such as a relational database or file-based storage may be used. In one example, the physical storage medium is an Oracle relational database. For example, object attributes or properties may be stored in rows of a table in a relational database, with a table provided for each class and object references stored as foreign key references or using junction tables for many-to-many relationships. The object manager 304, cache layer 306 and physical storage interface layer 308 implement a mapping between the object-oriented view of data provided to the application and the storage representation of the physical storage medium, e.g. a relational database schema.

Thus, regardless of the type of storage medium used, the 00 data access interface 304 (the object manager) provides an object-oriented view of the data and an object-oriented interface for reading and manipulating the data.

Figure 4:
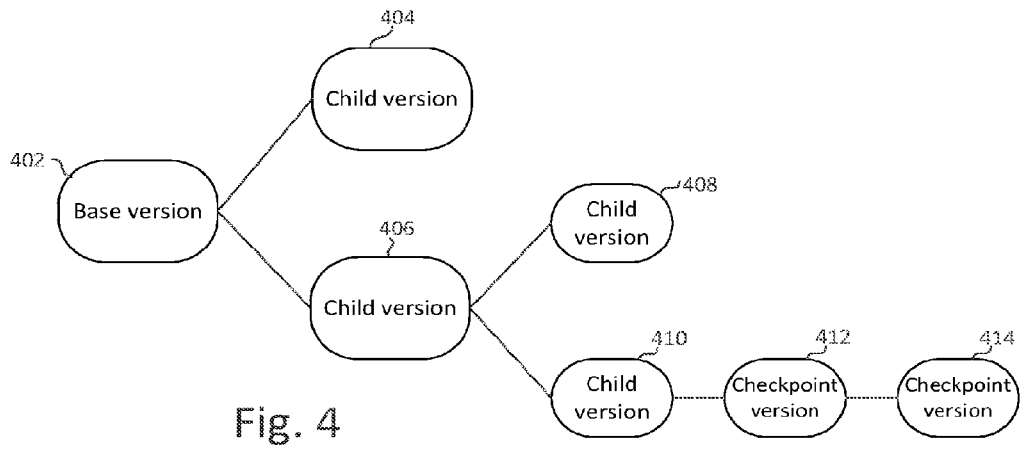
FIG. 4 illustrates versioning in a database.

Within a Gothic database, all data is stored in versions. Versions form a tree rooted on an initial, empty version. An immutable or frozen version may have child versions, each of which will initially be identical to its parent or base version, but which may be modified subsequently. FIG. 4 illustrates an example of a version tree, starting with a base version 402, forming the root of a hierarchical tree of child and grandchild versions 404-414.

Each version in principle represents the whole database but stores only the changes made with respect to the parent version (in other words, a version comprises difference information defining the difference between the version and its parent version). For example, if an object is added, deleted or modified in a version, then that change is recorded in the version, e.g. by adding a copy of the object with any required modifications to the version or adding an indication that the object has been deleted in the version. If an object is accessed that has not been modified in the current version, then the system looks back up the tree to the parent version and its ancestors until the requested object or object value is found. The versioning system allows different users to work on different parts of the data simultaneously without interfering with each other (e.g. versions 404 and 406 could correspond to different users updating different parts of the data).

Since a version only stores information identifying changes made in that version, the system also allows reverting to an earlier state of data in a straightforward manner by discarding the changes recorded in one or more versions. Versions created for this purpose are referred to as checkpoint versions (e.g. versions 412-414). A user making complex changes can create a series of such checkpoints, and revert to any checkpoint if a problem arises, at which point the change data in later versions is discarded. Alternatively, multiple checkpoints may be flattened into a single version by combining the corresponding change information (e.g. by merging checkpoint versions 412 and 414 into version 410). Merging versions involves combining the difference information of the versions so that the resulting version defines a single combined set of differences with respect to its parent version.

Updates to a version are preferably performed within transactions, referred to as local cache transactions. A local cache transaction is a series of operations which is applied to a version as if it were a single operation. Instead of applying the changes directly to the version, they are applied within the cache. When all the actions have been completed successfully, they are committed to the version. If a problem is discovered at some point during the chain of operations, the entire sequence can be abandoned, without having to unpick the effect of any earlier stages, as would be necessary if the operations were applied directly to the version.

Cache transactions can also be nested. Thus, the system preferably maintains a current cache transaction level, which is incremented when entering a cache transaction and decremented when leaving a transaction. This allows complex operations to be structured in a hierarchy of nested transactions, with rollback/commit available at each level.

Referring back to FIG. 1, a given data capture device 110 may update data of a version over the network. However, where a network connection is not available, the terminal may operate on a local copy of the version.

In a typical usage scenario, a user may wish to perform a survey and update geospatial information in the database using a mobile device such as a laptop computer as the input terminal. To do so, the user can create a new working version from a parent version (e.g. child version 410, FIG. 4) in the database. A copy of the working version is created in a local database in the user's data capture device, and the local database is populated with data from the main database (specifically from ancestor versions of the working version). Typically, this local copy will be a relevant extract from the parent database, not a complete copy; for example limited to a specific region and/or specific classes of objects relevant to the survey or other work being conducted.

The data is extracted from the database by the database server into an XML (eXtensible Markup Language) or GML (Geography Markup Language) file, which is transmitted to the data capture device 110. The device 110 contains its own implementation of the database (e.g. with the architecture depicted in FIG. 3). The local database is populated with the data from the XML/GML file.

Whilst working on the local copy, the user may create checkpoint versions 412, 414 as explained above. Once the work is complete, the checkpoint versions can be flattened (i.e. merged back into a single version) and the data for that version can then be extracted and transmitted back to the database server (e.g. again via an XML/GML file). The version with the new data is then added to the main database and becomes available to other users, and can be merged back into the parent version (e.g. version 406) if required.

The system allows multiple users to work on the same data at the same time. For example, users may be working on respective versions (408, 410), with overlapping or even identical data sets extracted to their local databases from the main database. Conflicts between different users' edits are detected and handled during check-in of the changes (i.e. when merging their changes back into the parent version, here 406). By contrast with pessimistic locking schemes, which allow only one user to edit a particular data object, this approach is referred to herein as optimistic locking, and is described in more detail below.

Rule-Based Validation

Embodiments of the invention provide for validation of changes made to the database using a configurable rule set. In one approach, validation of changes is carried out on-the-fly, as changes are made to a working version. Specifically, validation is performed on completion of a cache transaction, based on the predefined rules in the rules database. In particular, objects exiting cache transactions are validated using a generic validator method which searches for and applies all rules which target the object's class (or any superclass of the object's class). In another approach, validation may also be performed on integration of the working version back into the parent version. These approaches are described in more detail below, and may be used in combination.

The rules define domain-specific constraints that data in the database should comply with. For example, in the context of geospatial applications, the constraints may relate to required relationships between geospatial features, for example to specify that certain classes of objects (e.g. forest objects) may not spatially overlap other objects (e.g. water areas).

The rules are specified in a form that is semantically rigorous. Preferably, the rule representation used is based on a formal logic, in particular a first-order predicate logic or description logic. Each rule is specified as being applicable to particular class in the object-oriented class hierarchy (e.g. FIG. 2). The rules are preferably stored in the rules database using an XML encoding.

Figure 5:
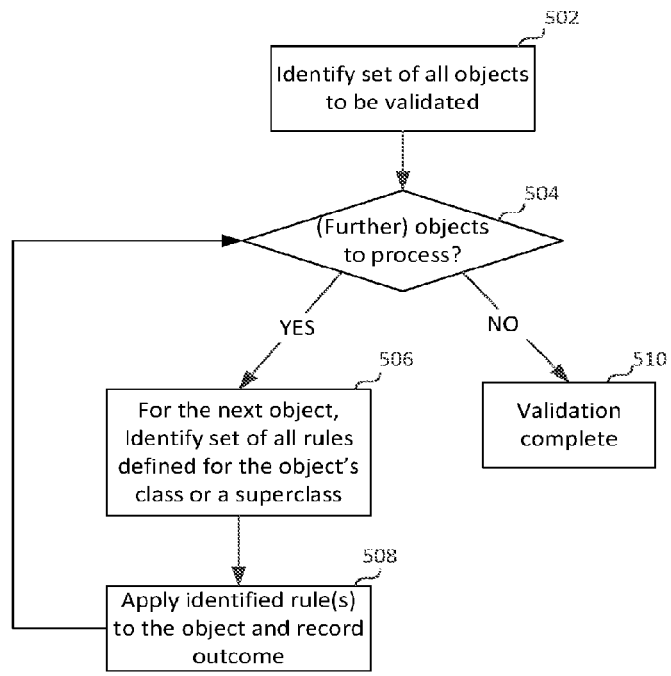
FIG. 5 illustrates a validation process.

The validation process is illustrated in overview FIG. 5.

In step 502, the set of objects to be validated are identified. These may have been specified by a user, or identified during modifications made to the database, as discussed in more detail below.

In step 504, the system determines whether there are any (further) objects to be processed. If yes, then in step 506, for the next object being processed, the system identifies from the available rules (e.g. those stored in the rules database 106, FIG. 1) those rules which are defined as being applicable to the class of the object or to a superclass of the object's class. The identified rules are applied in step 508 and the validation outcome is recorded. Applying a rule involves evaluating the rule, substituting any variables in the rule from the data of the object being evaluated (and possibly from related objects as required by the rule). Rules are logical statements which evaluate to either TRUE or FALSE; a TRUE evaluation result is taken to denote successful validation whilst a FALSE evaluation result is taken to denote failed validation. After the relevant rules have been evaluated, processing then returns to step 504 to process any remaining objects.

If there are no objects to process in step 504, or no further objects because all objects have been validated, then validation ends (step 510).

Alternatively, instead of performing complete validation for all objects, validation may be aborted earlier e.g. in response to an object failing a validation rule.

Figure 6:
FIG. 6 illustrates a rule editing interface.

Rules are preferably stored in an XML encoded format and may be specified and modified via a graphical user interface. An example of such a graphical user interface is shown in FIG. 6, and shows the rule in a tree representation 602 (essentially depicting a parse tree of the rule) and a corresponding automatically generated natural-language representation 604. The rule is specified as being applicable to a particular object class, here "FIRE_STATION".

The XML encoding of a rule includes a class label specifying the class to which the rule applies, together with nested XML elements specifying rule elements such as relational predicates and quantifiers. The rule representation language will be described in more detail below with examples of XML rule representations.

The above-described rule-based validation can be performed in a variety of situations. In a first example, on-the-fly validation of data changes is performed as part of data update transactions. In a second example, validation is performed when database versions are merged. These examples are described in more detail below.

On-the-Fly Validation

In this approach, validation of data is performed as changes are made to a working version. However, it is not always possible or convenient for all objects to remain in a valid state when updates are being made to the version. Therefore, in a preferred embodiment, validation methods are only invoked at the end of a local transaction, for all the objects implicated in the transaction.

In this approach, a local transaction is started, changes are made and an attempt is made to 'commit' the transaction. This will fail if the database is no longer in a valid state, whereupon either more changes can be made or the transaction can be 'rolled back'. It is generally not feasible to validate every object in the database every time a transaction is committed. Instead, only those objects 'implicated' by the transaction are validated. As described in more detail below, the object manager maintains lists of the objects involved in each local transaction.

Figure 7:
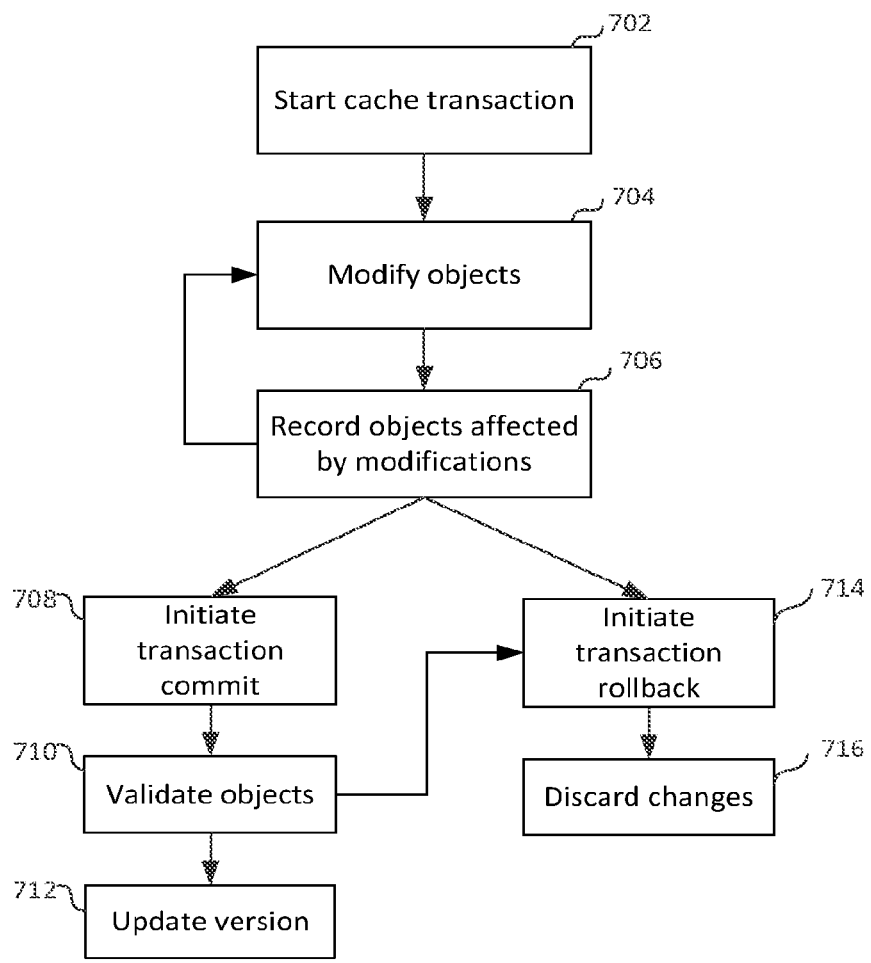
FIG. 7 illustrates a method for performing validation as part of a cache transaction.

The approach is illustrated in FIG. 7. In step 702, the application starts a new cache transaction. In step 704, data objects are added, deleted or modified within the context of the transaction. In step 706, the object manager records any objects affected by the modifications. Steps 704 and 706 may be performed repeatedly as part of the transaction.

In step 708, the object manager receives an instruction from the application to commit the cache transaction. In response, the object manager initiates validation of the affected objects in step 710. Assuming validation is successful, the object manager then commits the transaction, updating the working version with the changes made to the data objects in step 712.

Alternatively, the application may instruct rollback of the cache transaction, or rollback may be initiated following failed validation (step 714). In response, the changes made in the cache are discarded (716) without being applied to the version.

In a version with a complex data model, especially in a database which is navigational, it is common for an object to have other objects 'depending' on it. If an object is changed, this may mean that the objects which depend on it become invalid. So when an object is altered, as well as validating it, all the objects which depend on the object are also validated.

To achieve this, the step of identifying objects affected by modifications (step 706) preferably includes identifying the specific objects being modified, as well as any dependent objects that are indirectly affected by the changes. Dependent objects of a modified object may, for example, include:

Objects linked to an affected object by particular relationships

Objects representing spatial features that are spatially related, for example intersecting, overlapping, topologically connected or extending to within a defined distance of the modified object Objects having particular attributes or features in common with the modified object Which objects are considered "dependent" may depend on the function or semantics of an object. Accordingly, the identification of dependent objects preferably occurs by way of class methods associated with the object, allowing class-specific dependencies to be defined.

In a preferred embodiment, the rules-based validation is invoked through a transaction callback registration scheme that allows an application to define a listener which receives notification when an object enters or leaves a cache transaction. The application can then invoke the rules engine to apply specific rules or sets of rules. This behaviour is extrinsic to the dataset and can be varied by the application dynamically. This makes it a good fit for a rules-based behavioural solution, as rules bases are typically very dynamic.

In a preferred embodiment, the Object Manager provides for automatic execution of certain special methods in response to certain events in the object lifecycle. These are referred to as reflex methods. Particular reflex methods may be undefined for a particular class (in which case no action occurs), or may inherit default implementations from a superclass, or may be overridden for a specific class. Examples of reflex methods include constructor and destructor reflexes, which are invoked by the object manager when creating or destroying an object. Additionally, the system provides for:

A pre-modification reflex, executed prior to applying a modification to an object A post-modification reflex, executed after applying a modification to an object A dependencies reflex, which identifies dependent objects of the object and adds them to the list of objects affected by the transaction. The dependencies reflex is preferably invoked by the pre-modification reflex, by the post-modification reflex, or possibly by both.

Figure 8:
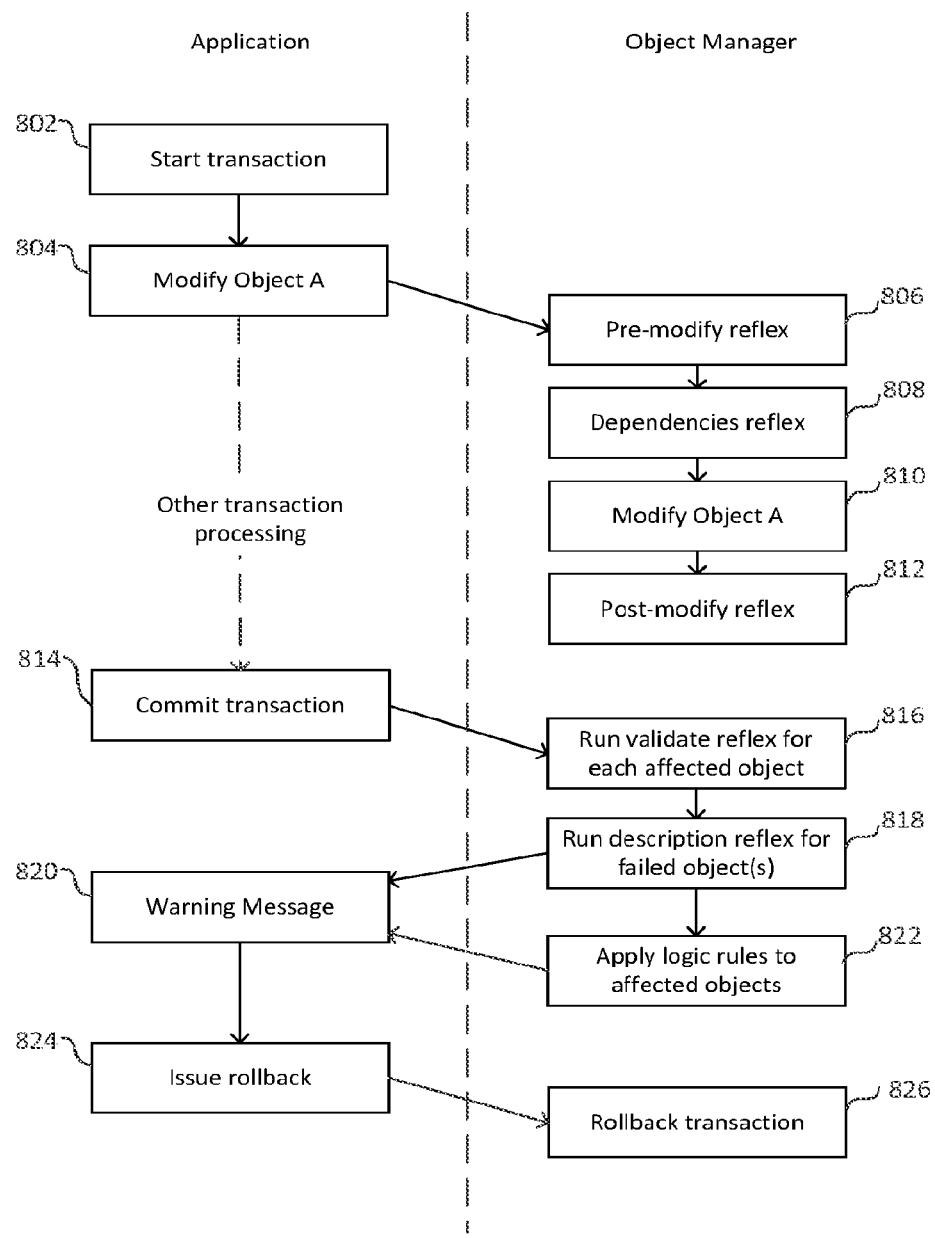
FIG. 8 illustrates processing of a transaction in more detail.

Object modification is illustrated in the upper half of FIG. 8, which illustrates processing of a transaction in more detail, divided into steps performed by the application (on the left), and steps performed by the Object Manager, which is a component of the Gothic database system (on the right).

In step 802, the application starts a new transaction. In step 804, the application calls a function which performs a modification of an object. The Object Manager responds to the modification in steps 806-812. Specifically, in step 806, the object manager invokes the pre-modify reflex for the object, if defined. As part of the method associated with the Pre-Modification reflex, the Dependencies reflex is normally called, step 808. This creates a list of objects that may be affected by any change to this object. Then the modification of the object is performed in step 810, as specified by the application. Subsequently, in step 812, the Post-Modification reflex is invoked (if defined).

Identifiers of the object being modified, and any dependent objects identified by the dependencies reflex in step 808, are added to a validation list of objects affected by the transaction (in preferred embodiments the validation list may comprise multiple sublists as described in more detail below).

Which objects are identified as "dependent objects" can thus be customized for a particular class by defining an appropriate dependencies reflex method for that class. This dependencies reflex method is then inherited by subclasses of the class which thus inherit the same behaviour (if not overridden in the subclass).

The object manager preferably also allows particular objects to be explicitly added to the validation list by way of an object manager function call.

In a preferred embodiment, two levels of validation are provided: an object-level validation implemented by a validation reflex defined on the object, together with the rule-based validation described above. This is illustrated in the second half of FIG. 8.

The object-level validation is implemented by way of a Validation reflex method on the object class. This therefore requires custom code development; the resulting validation behaviour is intrinsic to the schema and thus attached to the dataset rather than being defined by the application at run-time. The validation behaviour follows the object-oriented design of the schema; as with the dependencies reflex and other reflexes, the implementation of the reflex (in the form of a particular defined reflex method) may be inherited from a superclass or explicitly defined for a particular class.

Typically, the object-level validation is suitable for simpler, lower-level validation (e.g. checking validity of attribute values), against constraints that are not application-specific and that do not generally change. The rule-based validation, on the other hand, allows for the enforcement of real-world constraints based on domain knowledge, and the rules to be applied can be application-specific and can be selected and configured dynamically, at run-time, by the application.

Referring back to FIG. 8, the application issues a request to commit the transaction in step 814. In response, the Object Manager invokes the Validation reflex in step 816, for all relevant objects that require validation (i.e. the objects on the validation list). Specifically, this includes all objects that have been created or modified, as well as every object added to the validation list by the Dependencies reflex 808 triggered when objects were created, modified or deleted.

Subsequently, the rule-based validation is performed, as described previously (step 822), again for each object in the validation list If all object validations are performed successfully, the transaction is then committed.

If, however (as depicted in FIG. 8), a problem is discovered in the validation for one or more objects, the method associated with the Validation reflex may call the Description reflex 818 for the object in question. This obtains a description of the object that failed the validation, so that an error message may be composed, for display to the user (step 820). The rule-based validation may similarly generate warning messages (e.g. again using the description reflex method for the object) identifying objects that failed validation. The application may then rollback the entire transaction, if necessary (steps 824, 826).

If the local cache transaction is being performed as part of processing on a local copy at a data capture client device (e.g. device 110 in FIG. 1), the rules are provided to the data capture device in XML form as a backup from the server-based rules engine (i.e. from central rules database 106). This means that the same rules can be used in both environments.

Implementation Details

In a preferred embodiment, an obj_start_cache_transaction function is used to start a transaction within an application. When the sequence of operations is complete, the function obj_commit_cache_transaction can be used to apply the effect of the transaction to the version. If the user decides to abandon or cancel the sequence of operations, the function obj_rollback_cache_transaction can be used instead.

When the function obj_commit_cache_transaction is used, all objects affected by the changes, and any other objects which are related to them, are validated to check for inconsistent or inappropriate changes before any of the changes are applied to the version. If an error is discovered, the return code GOTH_VALIDATE is returned, and the function obj_get_validate_message can be used to warn the user. If it is not possible to correct and re-commit the error, the function obj_rollback_cache_transaction can be used to abandon the operations in the transaction.

The object manager maintains separate lists of all the objects modified in a cache transaction for convenience. The lists of objects maintained are: "created", "deleted", "modified", and "touched". An object which is created, deleted, modified or touched is said to be implicated in a transaction. Objects that are created, deleted or modified are added to the respective list by the object manager when the relevant change occurs. Objects identified by the "dependencies" reflex method are added to the "touched" list. Objects can also be implicated explicitly by invoking the obj_touch_object( ) method, which adds the relevant object to the "touched" list.

Objects may move between lists, for example from the modified list to the deleted list. A move from created to deleted simply results in the object being discarded altogether.

As indicated above, the validate reflex method provides for object-level validation, and returns a string. If the object on which the method is invoked is valid then the string returned is "OK" otherwise the returned string indicates the nature of the problem.

The 'dependency' reflex method returns a set of object-ids. It is invoked at various stages in the object life-cycle to 'implicate' additional objects in the transaction resulting in additional objects being validated. For example, the dependency method is called before and after an object is modified, before an attempt is made to destroy an object, and after the constructor method is called. Objects identified by the dependency method are added to the 'touched' list, indicating that they are implicated in the local transaction.

Object Lifecycle—Details

The following section provides some additional details of the operation of reflex methods during various stages of the object lifecycle in one implementation.

FIG. 12 illustrates the various reflex methods that are invoked at different points of the object lifecycle. These are also summarised in the table below:

| Object lifecycle | Reflex methods invoked in order |
|---|---|
| when an object is created | constructor; dependency; pre_commit; validate |
| when an object is modified (e.g. changed in any way) | dependency; pre_modify; post_modify; dependency; pre_commit; validate |
| when an object is deleted | dependency; destructor<br>If the destructor fails, i.e. the object is prevented from deletion, then:<br>pre_commit; validate |
| when an object is translated or propagated between datasets, for the target object: | constructor; dependency; pre_commit; validate |

As indicated above, the object manager maintains multiple collections of objects processed in the current transaction:

Created
Touched
Modified
Deleted

During the pre-commit phase, a collection is maintained of objects added to the cache transaction since the pre-commit operation started. Each of the above collections never contains more than one instance of a specific object.

Additional state information may be maintained for bracketed transactions, debugging, accelerating performance and for special processing of composite properties (defined by special methods that aggregate data from stored properties—there is no duplicate storage but the composite values can be indexed).

The following sections provide a simplified description of the steps involved in the main lifecycle operations for a given object (ignoring some details such as special treatment for composite values).

Construct:
Create the new object
Copy initial values provided by the caller onto the new object
Add the object to the "created" collection
Invoke the constructor reflex method for the object (if defined)
Invoke the dependency reflex for the object (if defined); each dependent object is considered to be "touched" and is added to the "touched" collection
If the constructor deleted the new object, add it to the "deleted" collection Destruct:
Invoke the dependency reflex for the object (if defined), adding each dependent object to the "touched" collection
Add the object to the "deleted" collection Invoke the destructor reflex method for the object (if defined)
If the destructor fails, undo any state changes made by this operation, otherwise:
Delete the object
Modify:
Add the object to the "modified" collection
Invoke the dependency reflex for the object (if defined), adding each dependent object to the "touched" collection
Invoke the pre-modify reflex for the object (if defined), passing it the current and proposed new values
If the pre-modify reflex requested the operation to be aborted, tidy up and return, otherwise:
Copy values provided by the caller onto the object
If updating the object did not delete it:
    Invoke the post-modify reflex for the object (if defined), passing it the current and proposed new values
    Invoke the dependency reflex for the object again (if defined), adding each dependent object to the "touched" collection (if not already in it)
Otherwise (object has been deleted):
    If the constructor deleted the new object, add it to the "deleted" collection
Touch:
Add the object to the "touched" collection
Start Cache Transaction
Increment the current cache transaction level
Reset "created", "modified", "deleted" and "touched" collections (i.e. the transaction starts with empty collections)
Commit Cache Transaction:
Invoke the pre-commit reflex on each created, modified and touched object. This includes processing additional objects added to the cache transaction by the pre-commit methods.
Validate each created, modified and touched object (unless "delayed validation" has been enabled, see below) by calling the object's validate reflex
If all objects were valid:
    Decrement the cache transaction level
    If a "leave transaction" callback is defined, invoke it for each object identified in the "created", "modified", "deleted" and "touched" collections
    Commit the data to the database.
Rollback Cache Transaction:
Decrement the cache transaction level
Roll back the database
If a "leave transaction" callback is defined, invoke it for each object identified in the "created", "modified", "deleted" and "touched" collections.

As indicated above, the system allows for "leave transaction" callbacks to be defined, which can be used to invoke external processing at the end (commit or rollback) of a transaction. Such callbacks may include a validation callback for invoking the rule-based validation engine as explained previously. For example, the validation callback may be to the validation engine directly, or to an application function which invokes the validation engine, passing the relevant object(s) or object identifier(s).

The validation engine then applies any relevant rules to the object for which it has been invoked. The rules engine returns a Boolean value to indicate whether an object is valid. It additionally provides an API for obtaining some information about which part of the rule failed. This allows the application to provide relevant error messages and/or take corrective action, for example to attempt to place the data in a valid state.

In one embodiment, the application registers a callback which takes any object "leaving" a transaction (i.e. objects affected by a transaction at the point of transaction commit) and asserts (using the rule cache) every rule whose target class applies to the object's class. Any non-conforming objects found will be held in a failed_set and also raised as application events and highlighted to the user via a user interface display. A user may then apply corrections, or corrections may be automatically applied. As objects are corrected, validation can be repeated. Revalidation checks whether the object is already in the failed_set. If so, and the object now passes validation, the object is removed from the failed_set and an application event is raised to unhighlight the previously failing object in the user interface.

Preferred embodiments may also provide delayed validation functionality. Delayed validation mode may, for example, be enabled/disabled by the application. Delayed validation allows normal object validation during cache transactions to be postponed and the affected/skipped objects added to a persistent delayed validation list which is validated when delayed validation mode is disabled, i.e. when normal validation is re-enabled.

Merging Versions—Validation and Optimistic Locking

Rule-based validation may also be performed when merging versions in the database.

In this case, the set of objects to be validated may simply be the objects that are marked as having been changed in the version (typically added or modified; deleted objects may not require validation).

Additionally, objects that were not changed in the version may need to be validated if they are in some way related to or dependent on objects that were changed (including deleted objects). Dependent objects may be identified in an analogous manner to the "dependencies" reflex described above, by use of a software mechanism that identifies a set of objects affected by the changes (e.g. related to the changed objects in certain specified ways) and adds the identified objects to the set of objects to be validated. For example, this may involve application of one or more filter rules to identify dependent objects.

The principles applied for identifying dependent objects in this scenario may be the same as set out above for on-the-fly validation (and may be object/class-dependent), or alternatively different rules and principles may be used for identifying dependent objects in this scenario. In an alternative approach, the dependent objects could be identified in both scenarios using the same underlying software mechanism, e.g. by invoking the "dependencies" reflex for each changed object as described previously.

The validation is performed as described in relation to FIG. 5 based on the changed objects in the version and any dependent objects of those objects. The validation may produce error messages for any objects failing validation, specifying which objects failed validation, and which rules were failed. Corrective action may then be taken (e.g. automatically or by the operator) to attempt to resolve problems.

Assuming validation is successful the versions are then merged by applying the object changes (additions, deletions, modifications) specified in the version being merged to the parent version.

As described previously, a particular scenario that involves merging of versions is when a user works on a local copy of data, e.g. stored on a data capture device 110 as depicted in FIG. 1. After the work is complete, the user may wish to "check in" the changes—i.e. integrate the changes back into the parent version. At this point, validation can be performed to ensure that the changes are consistent with the parent version.

In addition to validation, this may also involve checking for conflicts with changes checked in by other users. Performing conflict checking at this stage removes the need for providing a user with exclusive access to a certain set of data (by locking that set of data) at the time when the user's local copy is made.

Figure 9:
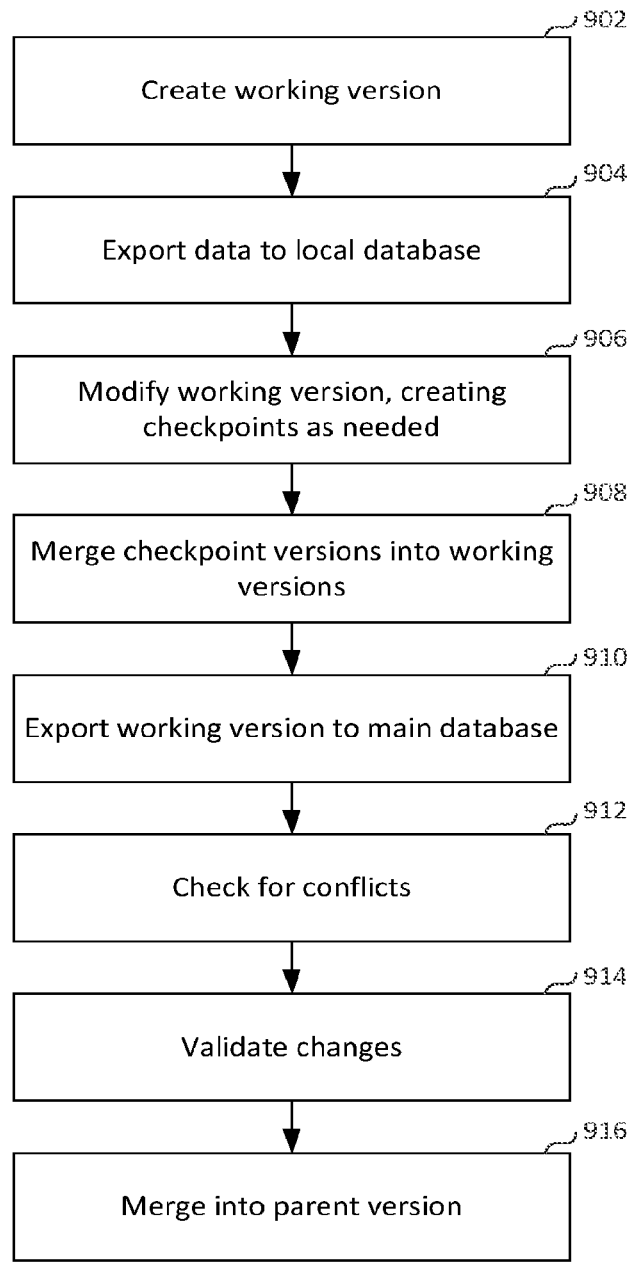
FIG. 9 illustrates a process for performing validation during merging of database versions.

The process is summarised in FIG. 9.

In step 902, the user creates a working version. In step 904 a relevant subset of data is exported to a local database in the user's data capture device. No locking of data occurs at this stage.

In step 906, the user modifies the working version in the local database, optionally creating a series of checkpoint versions. After the work is completed, the user initiates check-in of the modified data. This involves merging any checkpoint versions into the original working version in step 908. This results in the change information for each of the checkpoint versions being combined so that only a single set of change information remains. The working version is then exported to the main database 910. This involves extracting the necessary data for the changed objects from the working version in the local database, encoding the data in an XML/GML file, and transmitting the file to the database server 104 (see FIG. 1). The above steps are performed on the data capture device.

Subsequently the database server extracts the change information from the XML/GML file into its copy of the working version and performs a conflict check with the parent version of the working version (912), to determine whether any of the changes conflict with changes submitted by other users. Assuming there are no conflicts, rule-based validation is performed as described above to ascertain whether the modified data meets the specified rules (step 914). If validation is successful, then the changes are merged into the parent version in step 916.

The conflict check involves identifying conflicts with changes submitted by other users. If the current set of changes is the first set being merged into the parent version, no conflict exists and so no conflict checking is required. This occurs if the user is the only user working on a child version of the parent version in question, or if other users working on a child version have not yet checked in their changes.

If in the time since the user checked out the data (i.e. exported data to a working version in their local database), another user has checked in changes, a conflict may arise. For example, users may have made conflicting changes to object attributes, deleted relevant objects and the like.

If conflicts are detected, the merging may be aborted. Alternatively, the system may merge those changes that do not give rise to a conflict, whilst discarding changes that do give rise to a conflict. Suitable warning messages may be generated to inform the user or database manager of the changes that could not be merged.

In geospatial applications it is common for users to be working on different data subsets or at least on different aspects of the same data subsets. Conflicts are therefore expected to be rare. The described approach can thus allow more efficient multi-user access to data than approaches based on strict partitioning and/or pessimistic locking of data, with any conflicts instead being resolved when changes are checked in.

Automatically Resolving Problems Identified During Validation

In a preferred embodiment, a rule may additionally define one or more actions to be performed in an attempt to fix the underlying problem that resulted in an object failing the validation rule. Such actions could take the form of modifying the object or relationships with other objects, or of adding, modifying or deleting other related objects. The failed rule may be re-applied after the corrective action to confirm whether or not the object now meets the rule. The output of the rule-based validator indicates any corrective actions performed.

Detailed Description of the Rule Representation

The following section provides further detail of a rule representation that may be used in the above-described system. It will be understood, however, that this is merely one example of a suitable rule representation, and any other suitable representation could be used.

As indicated above, the rules are preferably encoded in XML. The syntax of the XML rules includes a variety of components, including:

Predicates—operators which return either true or false
Constants
Variables—free or bound
Built-in Functions
Logical Connectives—NOT, AND, OR
Quantifiers—universal, existential However, to simplify the representation, logical connectives and quantifiers are implemented as special forms of predicates.

Predicates

The following types of predicates may be provided: Relational Predicate; Exists Predicate; ForAll Predicate; Conditional Predicate; Referential Predicate; Range Predicate; And Predicate; Or Predicate; Not Predicate.

The RelationalPredicate is used to check whether two Values (see below) have a defined relation. It consists of two Values, a LeftValue (Lvalue), a RightValue (Rvalue) and a comparison operator (Relation).

The ExistsPredicate is an existential quantifier. It contains a feature type, a numerical quantifier, a relation and a child predicate. It allows expressions of the form, "There exist greater than 3 features of type B for which the following condition holds→{child predicate}". This may be used to test for the existence or absence of features of a particular type, as in "For Lake features: There exist exactly zero forest features for which the forest geometry is contained within the lake geometry."

The ForAllPredicate is a universal quantifier. It contains a feature type and two child predicates. It allows expressions of the form, "For all features of type X which satisfy {first child condition} verify that {second child condition} also holds true".

The ConditionalPredicate permits conditional evaluation of parts of a rule. It contains two child predicates. It allows expressions of the form, "If {first child condition} holds then check that {second child condition} also holds."

The ReferentialPredicate tests whether a particular named association exists between two features. It contains two target feature types and an association name. It allows expressions of the form, "Check if there exists a relationship from {feature instance A} to {feature instance B} via the association {reference name}".

The RangePredicate tests whether a value lies in a range. It contains three Values and tests the first supplied Value to find whether it lies between the second and third supplied Values. It allows expression of the form, "Check whether {First Value} lies between {Second Value} and {Third Value}."

The logical predicates AndPredicate, OrPredicate and NotPredicate allow for Boolean logic to be applied to any of the results returned by other predicate types. AndPredicate and OrPredicate take two child predicates and return the standard Boolean result. The NotPredicate logically inverts the sense of the child predicate result. Although, in a logic sense, these elements are connectives rather than predicates, they can be interpreted here as predicates because they are defined to be Boolean-valued operators which operate on the contained predicates which are themselves Boolean-valued.

Value Types

The following Value types may be provided: Static Value; Dynamic Value; Temporary Value; Conditional Value; Aggregate Value; Built-in Function Value; Class Value; Summed Value; Difference Value; Product Value; Quotient Value; Modulus Value; Negated Value.

A StaticValue is a typed constant. Its value is assigned explicitly within the rule expression and this value can then be used within other comparisons such as RelationalPredicates. The datatypes supported include scalar datatypes such as integers, reals and strings.

An AssignableValue represents a variable in a rule expression is one of two types—a DynamicValue is a typed attribute fetched from a feature instance, a TemporaryValue is used to hold a derived result within a rule for comparison in a later and possibly unrelated clause.

A ConditionalValue is a value which may take one of two values depending upon the truth of a child predicate. It contains two values and a predicate. If the predicate evaluates to true the first value is returned else the second is returned.

An AggregateValue is used to return some aggregated result (sum, average, concatenation, geometric union etc.) from a number of features. It contains a feature type, a feature attribute name, an aggregation function and a child predicate which holds true for the features to be aggregated. It allows expressions of the form, "For features of type {Type} which satisfy {Child Predicate}, compute and return the {Aggregation Function} from the attributes {Attribute Name}."

A BuiltinFnValue is used to derive one Value from another using a specified algorithm. It contains a Value of any type and an algorithm name. A variety of algorithms are supported varying by the datatype of the Value supplied, including simple mathematical and string manipulation functions as well as geometric algorithms such as convex hull, buffer or Douglas Peucker simplification. This functionality can be used, for example, to test whether a feature lies within a specified buffer of the geometry of another feature. (The set of supported algorithms can be augmented by implementing an algorithm according to a particular rules system interface. The algorithm then becomes available as another Built-in function within the rules language.)

A ClassValue returns the class name or feature type of a feature.

The final set of Value types are simple arithmetic convenience types, SummedValue, DifferenceValue, ProductValue, DivisionValue, ModulusValue, NegatedValue, having the conventional meanings.

Relation Types

Relation types may include scalar and spatial relations. The following scalar relation types may be provided: Equals Relation; NotEquals Relation; Less Relation; LessEquals Relation; Greater Relation; GreaterEquals Relation; Begins Relation; Ends Relation; RegExp Relation.

The following spatial relation types may be provided: Spatial Equals Relation; Spatial Disjoint Relation; Spatial Intersects Relation; Spatial Touches Relation; Spatial Overlaps Relation; Spatial Crosses Relation; Spatial Within Relation; Spatial Contains Relation; Spatial Within Distance Relation.

Scalar relations specify a relationship test between two scalar values of an appropriate type. Numerical relationships supported are EqualsRelation, NotEqualsRelation, LessRelation, LessEqualsRelation, GreaterRelation, GreaterEqualsRelation, with the conventional meanings. Character String relationships are BeginsRelation and EndsRelation which test whether a character string value begins or ends with the supplied fragment or RegExpRelation which tests whether a character string value matches a supplied fragment according to a PERL-compatible regular expression.

Spatial relation types correspond to the ISO/OGC Simple Feature specification spatial interaction types (ISO 19125-2:2004) and take those meanings. In addition to the topological interaction types, SpatialWithinDistanceRelation can be used to test whether two geometries approach within a user specified distance.

EXAMPLES

A first example of a rule is depicted in FIGS. 10A and 10B. This example represents a simple spatial consistency test. It states the single constraint that, in most cases, the presence of forest within water areas is inconsistent. Therefore, forest features should be tested to ensure that their geometry does not intersect the geometry of any water body features.

The illegal forest features can be depicted graphically as shown in FIG. 10A. The constraint might be expressed in prose as follows:

Check for Coniferous Forest objects that there are no Water Area objects for which Coniferous Forest.geometry overlaps Water Area.geometry The rule can be visualised using a predicate tree structure as shown in FIG. 10B. This tree shows that the main rule structure is an ExistentialPredicate testing for the existence (or non-existence in this case) of Water Area features which meet a particular Relational Predicate. The Relational Predicate tests candidate Water Area features to see whether their geometries overlap the Coniferous Forest feature currently under test. This predicate tree corresponds closely with the XML serialisation of this rule:

```
<?xml version="1.0"?>
<Rule>
  <RootPredicate classLabel="Coniferous Forest">
    <ExistsPredicate qualifier="exactly" n="0" classLabel="Water Area">
      <RelationalPredicate>
        <DynamicValueclassRef="Coniferous Forest" propName=
        "geometry"/>
        <SpatialOverlapsRelation/>
        <DynamicValue classRef="Water Area" propName="geometry"/>
      </RelationalPredicate>
    </ExistsPredicate>
  </RootPredicate>
</Rule>
```

The target feature types (i.e. target object classes) appear as the classLabel and classRef attributes of the appropriate Predicates and Values and the feature property names for each DynamicValue are given in the Value propName attribute.

A second example is depicted in FIGS. 11A and 11B. This second example illustrates that some complex and powerful expressions may be constructed from the relatively simple building blocks of Predicates, Values and Functions. Some slightly more advanced features of the rules language such as BuiltinFunctionValues and AggregateValues are used to demonstrate the use of derived results internal to the logic of the rule.

This rule tests that the shoreline of Island features matches the corresponding limits of all of the Water Areas which border the Island. The correct relationship between Island and Water Area can be portrayed as depicted in FIG. 11A. The Island is the dark hexagon at the centre of the picture. It is surrounded by a number of Water Area features (light hexagons). The derived shoreline of the Island is shown by the inner hexagonal ring 1102. The derived set of Water Area features which abut the Island are outlined by the outer ring 1104. The rule can be expressed in something approaching prose as:

Check for Island objects that outer_ring(Island.geometry) equals intersection(Island.geometry, union(WaterArea.geometry) over all Water Area objects for which (WaterAreageometry touches Island.geometry))

The corresponding predicate tree is depicted in FIG. 11B. This tree comprises the Relational Predicate which compares a BuiltinFunctionValue (outer_ring) with another BuiltinFunctionValue (geometric intersection) which in turn nests an AggregateValue (geometric union over Water Areas touching the Island) and tests them for (geometric) equality. The resulting tree is very compact for such a sophisticated expression. Once again the XML encoding closely mirrors the predicate tree structure:

```
<?xml version="1.0"?>
<Rule>
  <RootPredicate classLabel="Island">
    <RelationalPredicate>
      <BuiltinFnValue fnName="outer_ring">
        <DynamicValueclassRef="Island" propName="geometry"/>
      </BuiltinFnValue>
      <SpatialEqualsRelation/>
      <BuiltinFnValue fnName="intersection">
        <DynamicValue classRef="Island" propName="geometry"/>
        <AggregateValue fnName="union" classLabel="Water Area">
          <DynamicValue classRef="Water Area" propName="geometry"/>
          <RelationalPredicate>
            <DynamicValue classRef="Water Area" propName="geometry"/>
            <SpatialTouchesRelation/>
            <DynamicValue classRef="Island" propName="geometry"/>
          </RelationalPredicate>
        </AggregateValue>
      </BuiltinFnValue>
    </RelationalPredicate>
  </RootPredicate>
</Rule>
```

An XSLT stylesheet can also be provided for rendering rules into pseudo-prose (as depicted e.g. in FIG. 6, rule representation 604), although where rules incorporate many BuiltinFnValues and AggregateValues the result may become less clear and less like spoken English. It remains a good sanity check, however, as reading the styled rule through helps to confirm that the meaning has been captured correctly.

A further advantage of the strict hierarchical structure is that it is simple to parse the rule to determine its validity and feedback any syntactic inconsistencies (e.g. values out of scope) in the rule to the user.

It will be understood that the present invention has been described above purely by way of example, and modification of detail can be made within the scope of the invention.

The invention claimed is:

1. A method for validating data changes in a database, wherein the database is adapted to store a versioned dataset, wherein a dataset version specifies differences between itself and a parent dataset version from which the dataset version is derived, the differences corresponding to data changes made in the dataset version, and wherein validation is performed using a rules database storing a plurality of rules, the method comprising:
  receiving a request to merge a first dataset version into a second dataset version, the second dataset version being a parent dataset version of the first dataset version; and in response to the request:
  identifying a set of data entities affected by data changes made in the first dataset version, wherein identifying the set of affected data entities comprises:
    identifying changed data entities to which changes have been applied in the first dataset version; and
    identifying dependent data entities of the changed data entities wherein the dependent data entities comprise unchanged data entities that were not changed in the first dataset version but have a predetermined relationship with a changed data entity;
  validating data entities in the set of affected data entities using rules from the rules database, the validating comprising validating both the identified changed data entities and the identified unchanged dependent data entities using the rules; and
  merging the first dataset version into the second dataset version in dependence on the outcome of the validation.

2. A method according to claim 1, wherein merging the first dataset version into the second dataset version comprises modifying the second dataset version based on the differences specified in the first dataset version.

3. A method according to claim 1, wherein the changes include one or more of: addition of data entities, modification of data entities, and deletion of data entities.

4. A method according to claim 1, wherein the dependent data entities comprise one or more of:
  entities having one or more attributes or features in common with data entities of the plurality of changed data entities; and
  entities associated with changed data entities by explicit references in the database.

5. A method according to claim 1, wherein the database comprises geospatial data, and wherein identifying dependent data entities comprises identifying data entities having one or more predetermined geospatial relationships with changed data entities.

6. A method according to claim 5, wherein identifying data entities having one or more predetermined geospatial relationships with changed data entities comprises identifying data entities representing spatial features that are spatially related by one or more of: intersecting, overlapping, being topologically connected to or extending to within a defined distance of changed data entities.

7. A method according to claim 1, comprising, for each data entity to which changes have been applied in the first dataset version, invoking a dependencies method defined for the class of the data entity, the dependencies method returning a set of identifiers of dependent data entities; and adding the identified dependent data entities to the set of affected data entities.

8. A method according to claim 1, wherein the validating step comprises performing validation of each data entity identified in the set of affected data entities.

9. A method according to claim 1, further comprising analysing whether first changes made in the first dataset version conflict with second changes previously applied to the second dataset version; and performing the merging step in dependence on the analysis.

10. A method according to claim 9, comprising performing the merging step only when no conflicts are found or performing a partial merge based on any identified conflicts.

11. A method according to claim 9, wherein the first and second changes are associated with different database users.

12. A method according to claim 1, wherein the database stores geospatial data and wherein the rules database comprises one or both of: rules specifying geospatial constraints, and rules specifying required relationships between geospatial features.

13. A method according to claim 1, wherein rules in the rules database are associated with respective data entity types, and wherein for a given rule a respective associated data entity type indicates a type of data entity to which the given rule applies, the method comprising validating data entities in the set of affected data entities using rules selected from the rules database based on the data entity types of the affected data entities.

14. A method according to claim 13, the validating comprising, for a data entity to be validated, the data entity having a given data entity type:
identifying one or more validation rules stored in the rules database associated with a data entity type corresponding to the given data entity type; and
applying the identified validation rule(s) to the data entity.

15. A method according to claim 13, wherein the data entities are objects in an object-oriented data representation associated with the database, wherein the data entity types are classes of the objects and wherein rules in the rules database each specify an object class to which a respective rule applies.

16. A method according to claim 15, wherein the validating step comprises, for a data entity to be validated, the data entity having a given object class:
identifying one or more validation rules stored in the rules database defined for the given object class or a superclass of the given object class; and
applying the identified validation rule(s) to the data entity.

17. A method according to claim 1, comprising outputting validation result information indicating an outcome of the validation, preferably wherein the validation result information specifies one or both of: a set of data entities having failed validation; and for any data entity having failed validation, an indication of one or more failed validation rules.

18. A method according to claim 1, comprising performing a corrective action in response to a failed validation of a data entity, and optionally repeating the failed validation after performing the corrective action.

19. A tangible non-transitory computer readable medium comprising software code adapted, when executed on a data processing apparatus, to perform a method as set out in claim 1.

20. A system for validating data changes in a database, wherein the database is adapted to store a versioned dataset, wherein a dataset version specifies differences between itself and a parent dataset version from which the dataset version is derived, the differences corresponding to data changes made in the dataset version, and wherein validation is performed using a rules database storing a plurality of rules, the system comprising at least one processor and associated memory configured to:
receive a request to merge a first dataset version into a second dataset version, the second dataset version being a parent dataset version of the first dataset version; and in response to the request:
identify a set of data entities affected by data changes made in the first dataset version, wherein identifying the set of affected data entities comprises:
identifying changed data entities to which changes have been applied in the first dataset version;
identifying dependent data entities of the changed data entities, wherein dependent data entities comprise unchanged data entities that were not changed in the first dataset version but have a predetermined relationship with a changed data entity;
validate data entities in the set of affected data entities using rules from the rules database, the validating comprising validating both the changed data entities and the unchanged dependent data entities using the rules; and
merge the first dataset version into the second dataset version in dependence on the outcome of the validation.

* * * * *